United States Patent
Hashimoto et al.

(10) Patent No.: US 11,442,720 B2
(45) Date of Patent: Sep. 13, 2022

(54) COMMUNICATION ADAPTER AND PROGRAM UPDATE METHOD FOR COMMUNICATION ADAPTER

(71) Applicant: NORITZ CORPORATION, Hyogo (JP)

(72) Inventors: Takahito Hashimoto, Kobe (JP); Yasunori Imi, Kakogawa (JP); Naoki Tawada, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 227 days.

(21) Appl. No.: 16/757,285

(22) PCT Filed: Oct. 16, 2018

(86) PCT No.: PCT/JP2018/038487
§ 371 (c)(1),
(2) Date: Apr. 17, 2020

(87) PCT Pub. No.: WO2019/082738
PCT Pub. Date: May 2, 2019

(65) Prior Publication Data
US 2021/0149665 A1  May 20, 2021

(30) Foreign Application Priority Data
Oct. 26, 2017 (JP) .............. JP2017-206936

(51) Int. Cl.
*G06F 8/656* (2018.01)
*H04L 67/06* (2022.01)
*H04L 67/12* (2022.01)

(52) U.S. Cl.
CPC .............. *G06F 8/656* (2018.02); *H04L 67/06* (2013.01); *H04L 67/12* (2013.01)

(58) Field of Classification Search
CPC ................... G06F 8/656; H04L 67/06
(Continued)

(56) References Cited

U.S. PATENT DOCUMENTS

2010/0313192 A1* 12/2010 Natsume .................. G06F 8/65
                                                              717/168
2016/0139811 A1  5/2016 Ikeuchi
2016/0322973 A1  11/2016 Kojima et al.
2018/0262336 A1* 9/2018 Fujiwara ............ G07C 9/00571
2018/0341476 A1* 11/2018 Kitao ..................... H04L 67/34
(Continued)

FOREIGN PATENT DOCUMENTS

| JP | H08241206 A | 9/1996 |
| JP | 2003122574 A | 4/2003 |
| JP | 2005018660 A | 1/2005 |

(Continued)

OTHER PUBLICATIONS

Chandy, K. Mani, and Jayadev Misra. "Distributed simulation: A case study in design and verification of distributed programs." IEEE Transactions on software engineering 5 (1979): pp. 440-452. (Year: 1979).*

(Continued)

*Primary Examiner* — Satish Rampuria
(74) *Attorney, Agent, or Firm* — Studebaker & Brackett PC

(57) ABSTRACT

When a process of writing an update program distributed from a management center ends normally during a program update process, a communication adapter executes a restart process by the update program, while retaining a program executed before the program update process. A process of verifying communication between the communication adapter and the management center is automatically (Continued)

executed in a state in which the update program is in execution. When the communication is normal, the program update process is ended.

4 Claims, 6 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 2019/0258470 A1* | 8/2019 | Miyake | G06F 3/067 |
| 2019/0258476 A1* | 8/2019 | Miyazaki | G06F 8/658 |

FOREIGN PATENT DOCUMENTS

| | | |
|---|---|---|
| JP | 2005078582 A | 3/2005 |
| JP | 2009134563 A | 6/2009 |
| JP | 2009286600 A | 12/2009 |
| JP | 2016212460 A | 12/2016 |
| JP | 2017058026 A | 3/2017 |
| WO | 2014/199678 A1 | 12/2014 |

OTHER PUBLICATIONS

Clarke, Edmund M., E. Allen Emerson, and A. Prasad Sistla. "Automatic verification of finite-state concurrent systems using temporal logic specifications." ACM Transactions on Programming Languages and Systems (TOPLAS) 8.2 (1986): pp. 244-263. (Year: 1986).*

Kreutz, Diego, et al. "Software-defined networking: A comprehensive survey." Proceedings of the IEEE 103.1 (2014): pp. 14-76. (Year: 2014).*

Liu, Zhen-ya. "Hardware design of smart home system based on ZigBee wireless sensor network." Aasri Procedia 8 (2014): pp. 75-81. (Year: 2014).*

ElShafee, Ahmed, and Karim Alaa Hamed. "Design and implementation of a WIFI based home automation system." World academy of science, engineering and technology 68.2012 (2012): pp. 2177-2183. (Year: 2012).*

ElKamchouchi, H., and Ahmed ElShafee. "Design and prototype implementation of SMS based home automation system." 2012 IEEE International Conference on Electronics Design, Systems and Applications (ICEDSA). IEEE, 2012.pp. 162-167 (Year: 2012).*

International Search Report issued in PCT/JP2018/038487; dated Jan. 8, 2019.

* cited by examiner

COMMUNICATION ADAPTER AND PROGRAM UPDATE METHOD FOR COMMUNICATION ADAPTER

The present disclosure relates to a communication adapter. More particularly, the present disclosure relates to program update for a communication adapter used in a remote management system for a hot water using facility (such as, for example, a water heater, a multi-water heating system, a reheating system for water in a bath, a filtering apparatus, or a hot water heating apparatus).

BACKGROUND ART

Japanese Patent Laying-Open No. 2017-58026 (PTL 1) describes a remote management system for a multi-water heating system that is one example of a hot water using facility. In the remote management system described in PTL 1, various pieces of information about the water heating system are transmitted to a management center (server) via a communication adapter communicatively connected to the water heating system.

For example, the communication adapter is communicatively connected to the water heating system via a two-wire communication line, and is connected by wireless communication to a router connected to a communication network such as the Internet. Since the communication adapter is communicatively connected to the router and to the management center (server) via the communication network, bidirectional information transmission between the water heating system and the management center via the communication network is possible.

A prestored program is executed in the communication adapter, thereby implementing the information collection function of collecting various pieces of information about the water heating system, the communication function of connecting to the communication network, the information transmission function of transmitting the information collected from the water heating system to the management center (server) by using these functions, and others. Therefore, by updating the program stored in the communication adapter, the functions of the communication adapter can be upgraded.

Japanese Patent Laying-Open No. 2009-286600 (PTL 2) describes that a program in operation is updated only when a result of self-diagnosis of a transmitted update program is normal at the time of update of a control program in a building monitoring system.

CITATION LIST

Patent Literature

PTL 1: Japanese Patent Laying-Open No. 2017-58026
PTL 2: Japanese Patent Laying-Open No. 2009-286600

SUMMARY OF INVENTION

Technical Problem

However, program update in a system where remote management involves communication between a management center (server) and a communication adapter as described in PTL 1 requires not only self-diagnosis of contents of an update program but also normal communication with the management center when the update program is executed.

The present disclosure has been made to solve the above-described problem, and an object of the present disclosure is to appropriately manage program update in accordance with a result of communication with an external apparatus after the program update, in a communication adapter applied to a remote management system for a hot water using facility using communication with the external apparatus.

Solution to Problem

According to an aspect of the present disclosure, a communication adapter connected to a hot water using facility via a communication line includes: a communication circuit; a memory; and a controller. The communication circuit receives and transmits information from and to an external apparatus via a communication network. The memory includes a plurality of program storage areas whose stored contents are rewritable. The controller operates the communication adapter by execution of a program stored in a specified one of the plurality of program storage areas. The communication circuit receives an update program from the external apparatus when a program update process is started up. When the program update process is started up during execution of a program stored in a first program storage area of the plurality of program storage areas specified at the time of a startup process, the controller executes a process of writing the update program received by the communication circuit into a second program storage area, the second program storage area being a program storage area of the plurality of program storage areas different from the first program storage area. When the process of writing ends normally, the controller specifies the second program storage area and re-executes the startup process, while retaining contents stored in the first program storage area. After the controller specifies the second program storage area and re-executes the startup process, the controller verifies whether or not communication with the external apparatus is possible, and when normal communication with the external apparatus is possible, the controller ends the program update process in a state in which the communication adapter is in operation by the update program.

According to the above-described communication adapter, it can be automatically checked that communication with the external apparatus (server) is normal and the program update process can be ended, in a state in which the update program for which the writing process has normally ended is in execution. Thus, program update can be appropriately managed in accordance with a result of communication after the program update.

Advantageous Effects of Invention

According to the present disclosure, program update can be appropriately managed in accordance with a result of communication with an external apparatus after the program update, in a communication adapter applied to a remote management system for a hot water using facility using communication with the external apparatus.

DESCRIPTION OF EMBODIMENTS

Figure 1:
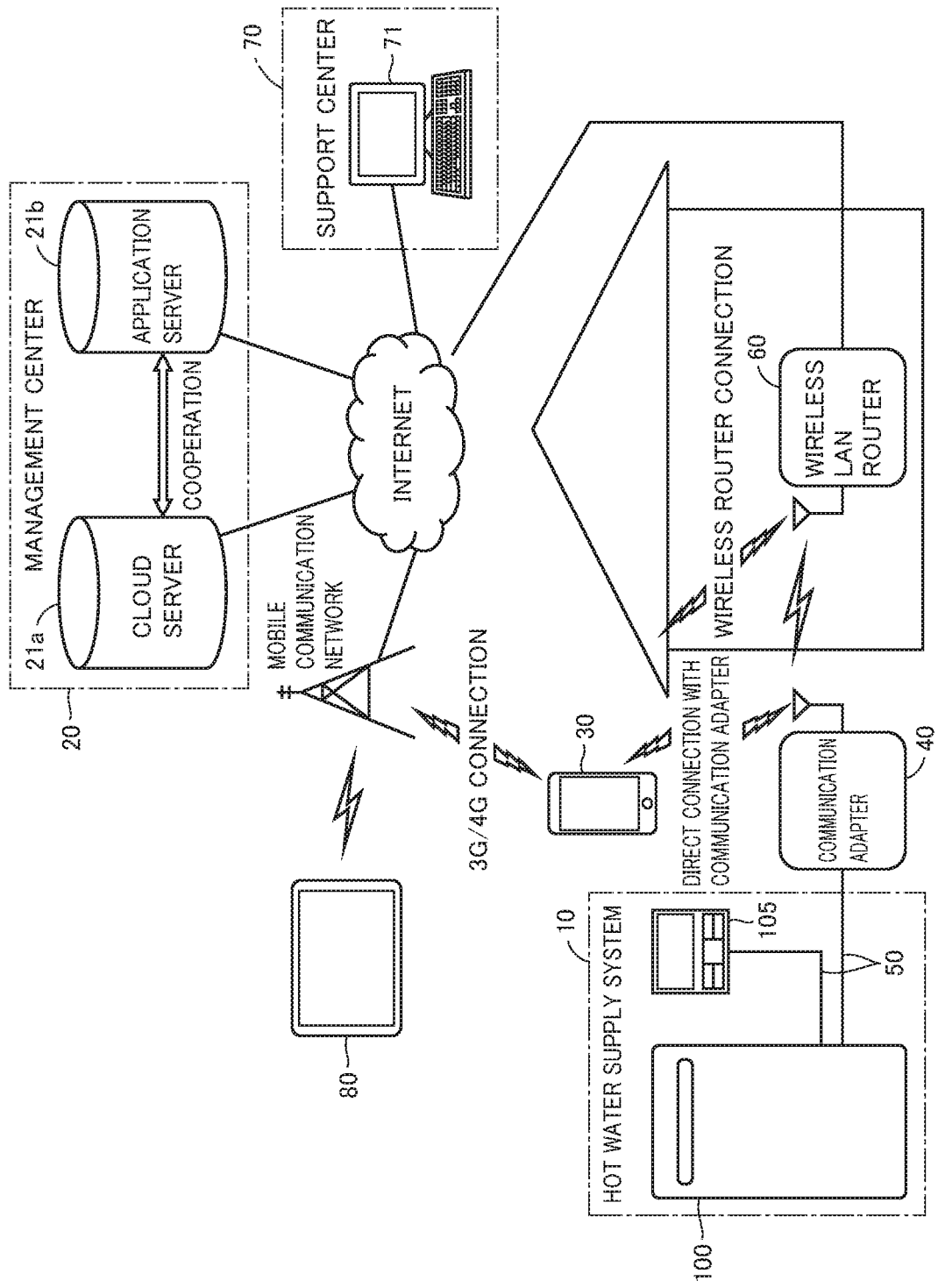
FIG. 1 is a block diagram showing a configuration example of a remote management system for a hot water using facility to which a communication adapter according to the present embodiment is applied.

An embodiment of the present disclosure will be described in detail below with reference to the drawings, in which the same or corresponding portions are denoted by the same reference characters and description thereof will not be repeated in principle.

FIG. 1 is a block diagram showing a configuration example of a remote management system for a hot water using facility to which a communication adapter according to the present embodiment is applied.

Referring to FIG. 1, a hot water supply system 10 includes a hot water supply apparatus 100 that is one example of the hot water using facility, and a remote controller 105 configured to input an instruction to operate hot water supply apparatus 100. In the present embodiment, hot water supply apparatus 100 is a target of remote management.

In hot water supply system 10, hot water supply apparatus 100 and remote controller 105 are connected to be communicable with each other via a two-wire communication line 50. More specifically, a controller (not shown) including a microcomputer and the like is built into each of hot water supply apparatus 100 and remote controller 105, and these controllers are configured to be able to perform serial communication with each other via two-wire communication line 50 in accordance with a predetermined communication protocol. In addition, hot water supply apparatus 100 can be configured to output a power source voltage for an external apparatus to two-wire communication line 50. In this case, the communication data can be superimposed on the power source voltage.

Furthermore, the controller of hot water supply apparatus 100 is connected to a communication adapter 40 via two-wire communication line 50. As one example, hot water supply system 10 and communication adapter 40 can be placed outside (e.g., in the vicinity of an outer wall of a house, in a garage and the like). Communication adapter 40 has the wireless communication function for communicating with a wireless LAN (Local Area Network) router 60 arranged inside in accordance with a predetermined communication protocol (such as, for example, IEEE 802.11n). The details of communication adapter 40 will be described later.

Wireless LAN router 60 is connected to the Internet network (communication network). Wireless LAN router 60 can also function as a wireless LAN master unit so as to wirelessly connect a plurality of wireless LAN slave units.

A smartphone 30 and communication adapter 40 can operate as wireless LAN slave units, and can be connected to the Internet via wireless LAN router 60 when a wireless link to wireless LAN router 60 is established. Smartphone 30 is configured to be connected to the Internet network via the mobile communication network such as the 4G line and the 3G line when the Internet connection via wireless LAN router 60 is impossible.

Furthermore, in the remote management system for the hot water using facility according to the present embodiment, a management center 20 and a support center 70 are connected to the Internet network (communication network). Management center 20 includes a cloud server 21a and an application server 21b. Cloud server 21a and application server 21b are connected to be communicable with each other via the Internet network or a dedicated line, and can provide various services in cooperation with each other.

Figure 2:
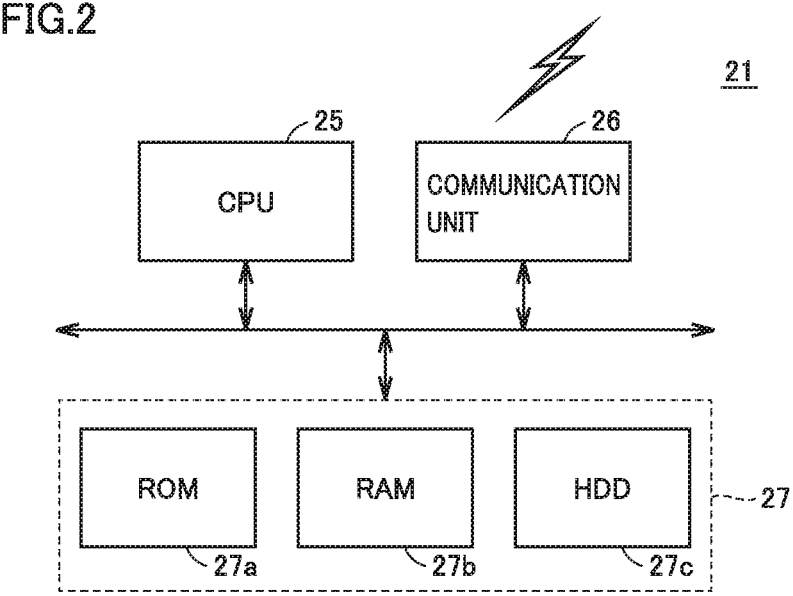
FIG. 2 is a schematic configuration diagram of a server device forming a cloud server and an application server shown in FIG. 1.

FIG. 2 is a schematic configuration diagram of a server device 21 forming cloud server 21a and application server 21b.

Referring to FIG. 2, server device 21 includes a CPU (Central Processing Unit) 25 configured to control the entire device, and a communication unit 26 and a memory 27 connected to CPU 25. Communication unit 26 has the function of communicating with another device or server by communication connected to the communication network (Internet).

Memory 27 includes, for example, a ROM (Read Only Memory) 27a that is a memory configured to store a program executed on CPU 25, a RAM (Random Access Memory) 27b that is a memory configured to serve as a work area when executing the program on CPU 25 or store a calculated value, and an HDD (Hard Disk Drive) 27c that is one example of a large-size storage device.

Server device 21 can be configured to have the function corresponding to a general computer. Server device 21 may further include at least one of a display and an operation unit configured to accept an operation input.

Referring again to FIG. 1, multiple communication adapters 40 placed in respective households are constantly connected to cloud server 21a and cloud server 21a communicates with these communication adapters 40, whereby cloud server 21a mainly collects and manages various pieces of information about hot water supply systems 10 in the respective households. For example, the collected information can include an amount of supplied hot water per unit time and an amount of fuel consumption per unit time, a temperature of supplied hot water, the error information occurring in each hot water supply system 10, and the like.

Application server 21b manages multiple user accounts for multiple users in the respective households, and accepts a login from an operation terminal such as smartphone 30 owned by each user and provides various services to the operation terminal owned by each user.

Preferably, dedicated application software for using the services provided by application server 21b is installed onto smartphone 30, such that the login operation and various operations after login can be performed using this application software. Alternatively, the services may also be provided on a Web basis, such that the login operation and the other operations can be performed using the appropriate Web browser.

Application server 21b can also be configured such that application server 21b provides only an application service for the user terminal such as smartphone 30 and the customer information including the user accounts is managed by another customer information management center. Alternatively, cloud server 21a and application server 21b may be configured by an integrated server device.

The services provided by cloud server 21a and application server 21b can be appropriately designed as needed. For example, the connected apparatus checking service, the operation information collecting and managing service, the error monitoring service, the maintenance monitoring service, the remote operation service and the like can be provided.

In accordance with the connected apparatus checking service, the type and the system configuration of hot water supply apparatus 100 of hot water supply system 10 connected to communication adapter 40 described below can be checked. Based on the information collected from hot water supply system 10 by communication adapter 40, the type and the system configuration can be determined on the server side.

In accordance with the operation information collecting and managing service, the operation information about hot water supply system 10 can be periodically collected from communication adapter 40 and managed every unit time (e.g., every one hour). Although the collected operation information is arbitrary, a cumulative amount of supplied hot water or a cumulative amount of fuel consumption per unit time can, for example, be collected. The collected operation information can also be used to create development materials based on big data analysis.

In accordance with the error monitoring service, when an error occurs in hot water supply system 10, the information about the error can be obtained from communication adapter 40 and notification of the error can be provided to a terminal 71 of support center 70 or an e-mail address of the user.

In accordance with the maintenance monitoring service, the operating condition of hot water supply system 10 can be monitored in real time at the time of repair of hot water supply system 10 and the like. Specifically, the operating condition of hot water supply system 10 connected to specified communication adapter 40 can be monitored in real time on a tablet terminal 80 and the like of an on-site operator communicatively connected to cloud server 21a.

In accordance with the remote operation service, a predetermined operation of hot water supply system 10, such as, for example, an operation for switching on and off the hot water supply operation and an operation for changing the hot water supply set temperature, can be remotely performed using terminal 71 of support center 70, smartphone 30 owned by the user, and the like. For example, the remote operation by the user can be performed by logging in to application server 21b from smartphone 30 and the like.

In addition, as a part of the services in the remote management system, the operation information collected from communication adapter 40 can also be displayed to be viewable on smartphone 30 in the logged-in state.

Hot water supply system 10 remotely monitored and/or remotely operated by the remote management system according to the present embodiment is communicatively connected to communication adapter 40 via two-wire communication line 50. Communication adapter 40 can collect various pieces of information from hot water supply system 10 and transmit the information to management center 20, and conversely, can receive the information from management center 20. Communication adapter 40 can also output an operation instruction to hot water supply system 10 based on an instruction provided from support center 70 or smartphone 30 owned by the user.

Figure 3:
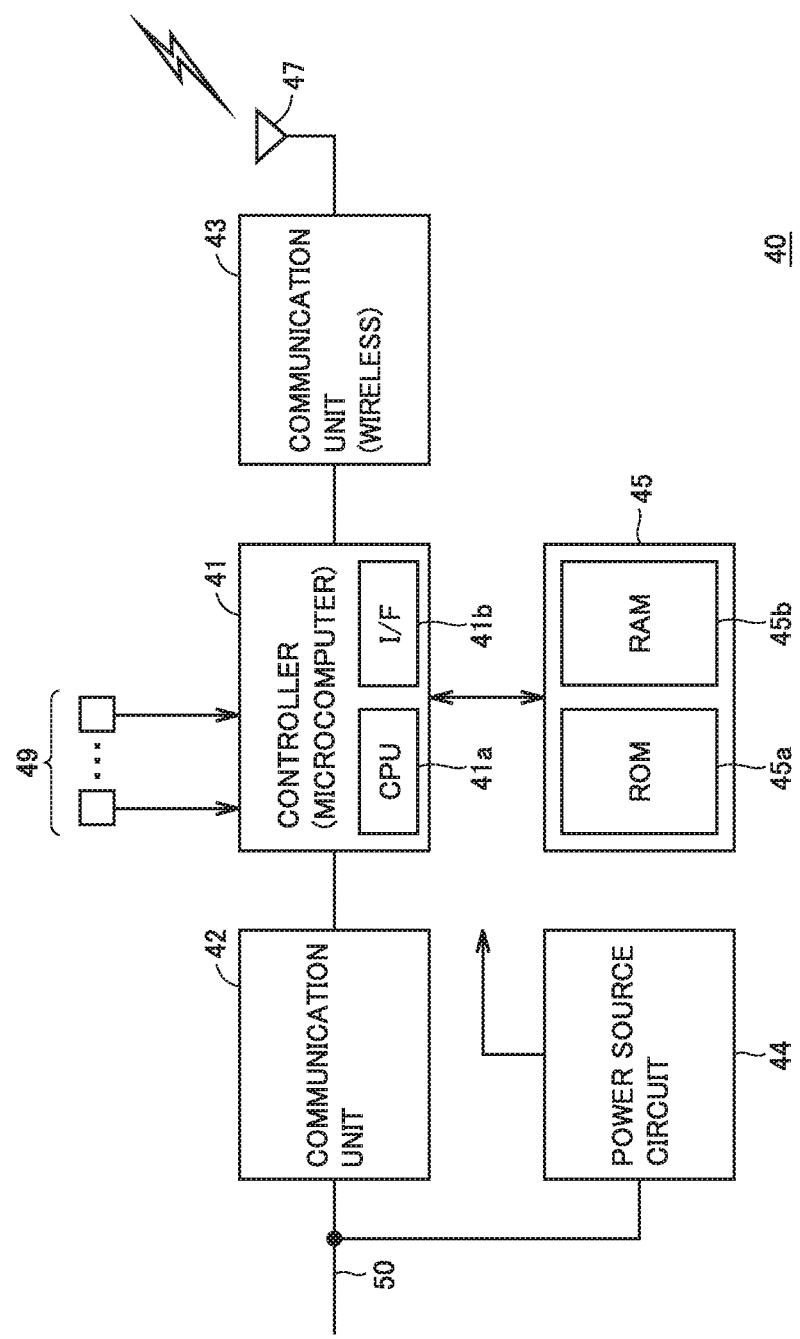
FIG. 3 is a block diagram showing a configuration example of the communication adapter shown in FIG. 1.

FIG. 3 is a block diagram showing a configuration example of communication adapter 40.

Referring to FIG. 3, communication adapter 40 includes a controller 41, communication units 42 and 43, a power source circuit 44, a memory 45, an antenna 47, and a manual switch 49.

Controller 41 can be configured by a microcomputer including a CPU 41a and an interface (I/F) 41b. Communication unit 42 is configured to be able to bidirectionally receive and transmit data from and to hot water supply apparatus 100 and remote controller 105 via two-wire communication line 50. Communication unit 43 is configured to be able to bidirectionally receive and transmit data from and to wireless LAN router 60 and smartphone 30 by wireless communication via antenna 47. Power source circuit 44 is supplied with electric power from two-wire communication line 50 and generates an operating power source voltage for each component in communication adapter 40.

Memory 45 has a ROM 45a and a RAM 45b. ROM 45a is configured by a non-volatile memory (typically a flash memory), and thus, the contents stored in ROM 45a are retained even when communication adapter 40 is powered off. In addition, the contents stored in ROM 45a can be rewritten by controller 41.

RAM 45b is configured by a volatile memory (typically DRAM (Dynamic Random Access Memory)), and thus, the contents stored in RAM 45b are cleared when communication adapter 40 is powered off. Particularly, the contents stored in RAM 45b are initialized at the time of a process of starting up communication adapter 40.

For example, a program for controlling the operation of communication adapter 40 is stored in ROM 45a, and at the time of the startup process, controller 41 reads the program stored in ROM 45a and loads the program into RAM 45b. In the following description, controller 41 executes the program loaded into RAM 45b and controls the operation of communication adapter 40. Although memory 45 and controller 41 are shown as separate components in FIG. 3, a part or all of memory 45 can also be built into controller 41. Similarly, at least a part of controller 41, communication units 42 and 43, power source circuit 44, memory 45, antenna 47, and manual switch 49 shown as separate components in FIG. 3 can also be configured integrally.

Manual switch 49 can be configured by a push switch that can be operated by the user, the operator or the like. In response to the operation of manual switch 49, a predetermined electric signal is input from manual switch 49 to controller 41. Thus, controller 41 can sense the operation of manual switch 49.

Using communication unit 43, communication adapter 40 can communicate with communication unit 26 of management center 20 via the communication network (Internet). Thus, communication adapter 40 can periodically transmit the operation information about hot water supply system 10 for the above-described operation information checking service to management center 20. On the other hand, management center 20 can also transmit data and information to communication adapter 40. For example, in the case of upgrading the program (so-called firmware) of communication adapter 40, a new program can be distributed from management center 20 to communication adapter 40.

In the configuration example of FIG. 3, communication unit 43 corresponds to one example of "communication circuit", ROM 45a corresponds to one example of "memory", and controller 41 configured by the microcomputer corresponds to one example of "controller". In addition, management center 20 corresponds to one example of "external apparatus".

Figure 4:
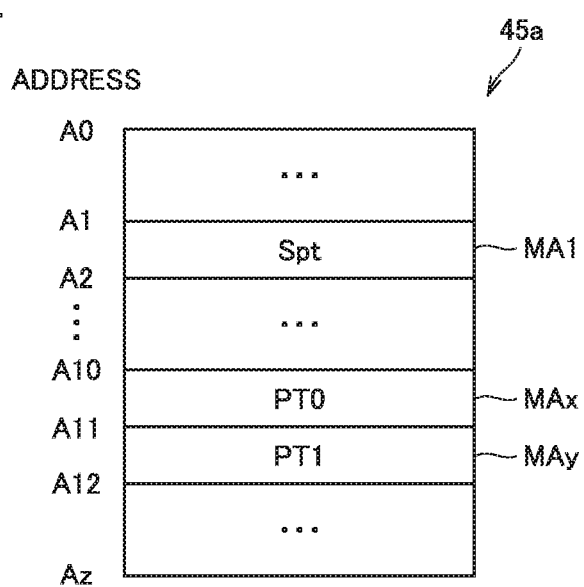
FIG. 4 is a memory map of a ROM shown in FIG. 3.

FIG. 4 is a memory map of ROM 45a shown in FIG. 3.

Referring to FIG. 4, ROM 45a has storage areas divided by addresses A0 to Az. For example, a plurality of program partitions (hereinafter also simply referred to as "partitions") are provided in ROM 45a as areas for storing the program (firmware) to be executed on controller 41. In the example of FIG. 4, a partition PT0 is provided in an area MAx corresponding to addresses A10 to A11, and a partition PT1 is provided in an address area MAy corresponding to addresses A11 to A12. Partitions PT0 and PT1 correspond to one example of "plurality of program storage areas".

Furthermore, partition selection data Spt is stored in an address area MA1 of ROM 45a corresponding to addresses A1 to A2. Partition selection data Spt is the information for selecting one of partitions PT0 and PT1.

At the time of the startup process, controller 41 reads partition selection data Spt and reads the stored program from one of partitions PT0 and PT1 in accordance with the value of the first byte of partition selection data Spt. For example, when the first byte of partition selection data Spt is "0 (hexadecimal notation)", the program is read from partition PT0 and loaded into RAM 45b. On the other hand, when the value of the first byte of partition selection data Spt is "1 (hexadecimal notation)" at the time of the startup process, the program read from partition PT1 is loaded into RAM 45b.

After the startup process, controller 41 sequentially executes the program loaded into RAM 45b and thereby controls the operation of communication adapter 40. Therefore, by updating the program stored in partition PT0 or PT1, the above-described functions of communication adapter 40 can be upgraded.

In order to update the program, it is necessary to write a new program into ROM 45a that is a non-volatile memory. In the communication adapter according to the present embodiment, a new program (hereinafter also referred to as "update program") downloaded from management center 20 is stored in ROM 45a and the program is thereby updated. Namely, unlike the program update by the operator, program update can be remotely performed without powering off communication adapter 40.

Figure 5:
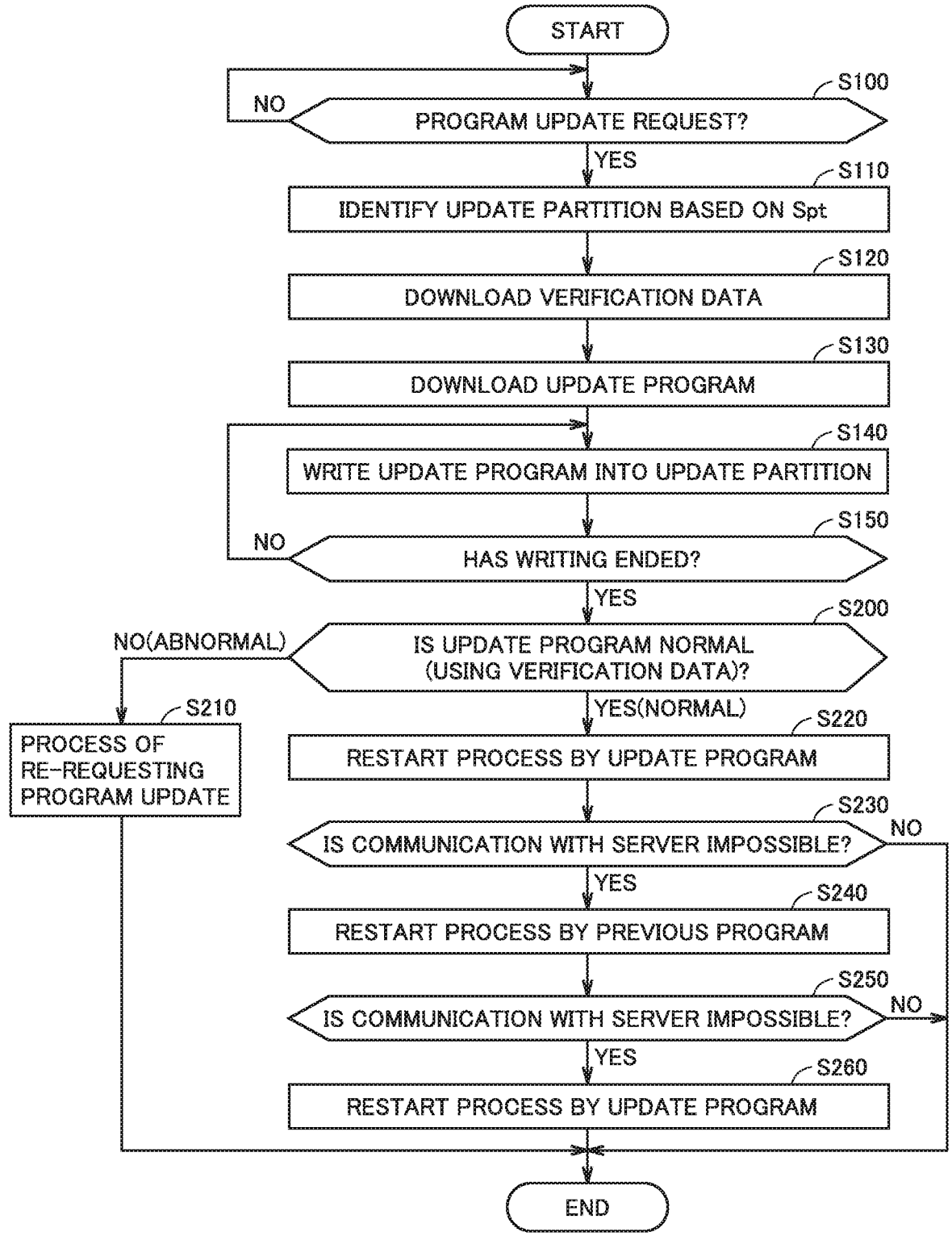
FIG. 5 is a flowchart illustrating a process procedure when program update is performed in the communication adapter according to the present embodiment.

FIG. 5 is a flowchart illustrating a process procedure when program update is performed in the communication adapter according to the first embodiment. The control process shown in FIG. 5 can be repeatedly executed by controller 41 of communication adapter 40.

Referring to FIG. 5, in step S100, controller 41 determines whether or not there is a program update request. For example, the update request is directly transmitted from management center 20. Alternatively, a program update reservation date is transmitted from management center 20 to communication adapter 40, and when the reservation date arrives, determination of YES is made in step S100 and the process proceeds to step S110 and the subsequent steps. When there is no update request (NO in S100), the program update process in step S110 and the subsequent steps is not started up.

When the program update process is started up (YES in S100), controller 41 identifies a partition (hereinafter also referred to as "update partition") into which the downloaded program should be written, based on partition selection data Spt, in step S110. The update partition is a partition different from a partition (hereinafter also referred to as "execution partition") in which a currently-executed program is stored. Namely, in the flowchart in FIG. 5, the execution partition corresponds to "first program storage area", and the update partition corresponds to "second program storage area".

For example, when the program stored in partition PT0 is currently in execution, partition PT1 is identified as the update partition. Namely, partition PT0 corresponds to "first program storage area", and partition PT1 corresponds to "second program storage area".

In contrast, when the program stored in partition PT1 is currently in execution, partition PT0 is identified as the update partition. Namely, partition PT1 corresponds to "first program storage area", and partition PT0 corresponds to "second program storage area".

In step S120, controller 41 downloads verification data for the update program from management center 20 using communication unit 43. The verification data can be created by, for example, CRC (Cyclic Redundancy Check) that is one type of error detection code.

Furthermore, in step S130, controller 41 downloads the update program from management center 20. In step S140, controller 41 sequentially writes the downloaded update program into the update partition identified in step S110. Controller 41 repeats the process in step S140 until writing of the update program ends (NO in S150).

When writing of the update program ends (YES in S150), controller 41 moves the process to step S200 and determines, using the verification data, whether or not the update program written into the update partition is normal.

When the written update program is abnormal (NO in S200), controller 41 executes a process of re-requesting program update in step S210 and temporarily ends the program update process started up in step S100. When determination of YES is again made in step S100 at the subsequent timing in accordance with the contents of the re-requesting process in step S210, program update can be tried again.

In contrast, when the written update program is normal (YES in S200), controller 41 rewrites partition selection data Spt to the contents that specify the update partition identified in step S110, and executes a restart process in step S220. Thus, the update program written into the update partition is loaded from ROM 45a into RAM 45b and communication adapter 40 is restarted. At this time, the contents stored in the execution partition in step S110 are retained.

Furthermore, after the restart process by the update program, controller 41 verifies communication with management center 20 (hereinafter also referred to as "server 20") in step S230. When the communication with server 20 is normal (NO in S230), the program update process is ended in a state in which the update program is in execution.

In contrast, when the communication with server 20 is impossible after the restart process by the update program (YES in S230), controller 41 executes a restart process by a previous program executed at the time of startup of the program update process in step S240. Namely, partition selection data Spt is rewritten to the contents that specify the execution partition in step S110 and the restart process is executed.

Furthermore, after the restart process by the previous program, controller 41 verifies communication with server 20 in step S250, similarly to step S230. When the communication with server 20 is normal (NO in S250), the program update process is ended in a state in which the previous program is in execution.

When the communication with server 20 is impossible after the restart process by the previous program (YES in S250), controller 41 moves the process to step S260. In this case, the communication with server 20 is impossible using any of the update program and the previous program, and thus, there is a high possibility that the update program is not defective but the communication function of communication adapter 40, wireless LAN router 60 or the like is defective or the communication itself is defective due to poor radio wave conditions. Therefore, in step S260, controller 41 executes restart process by the update program received in the current program update process and ends the program update process, similarly to step S220.

In steps S230 and S250, data including a response request can be transmitted from communication unit 43 of communication adapter 40 to server 20. When server 20 normally receives the data at communication unit 26, a response notification corresponding to the response request is returned to communication adapter 40. For example, in communication adapter 40, the communication with server 20 can be verified based on whether or not communication adapter 40 can receive the above-described response notification until a certain amount of time elapses since the data including the response request is transmitted.

Figure 6:
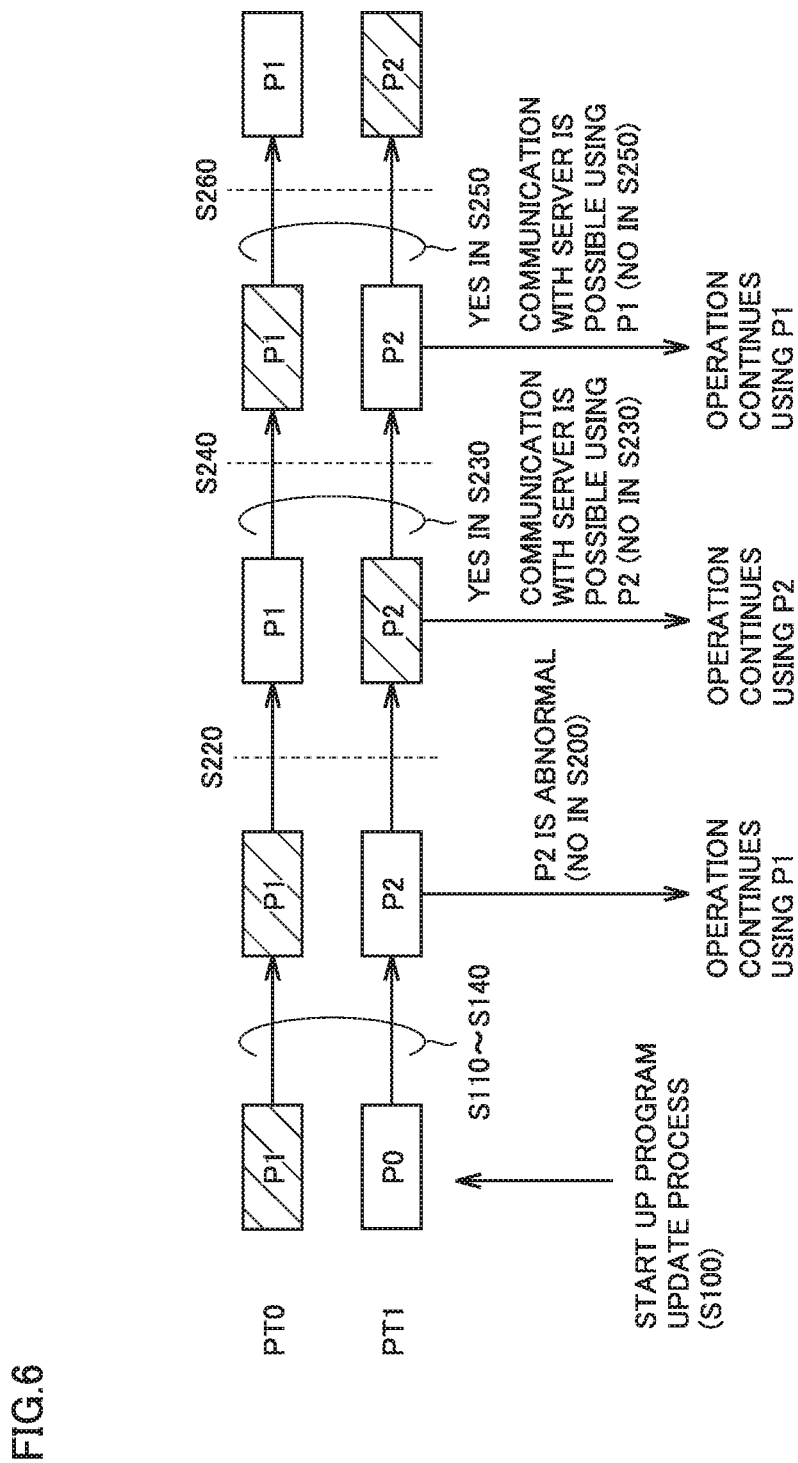
FIG. 6 is a conceptual diagram for illustrating a change in state of the communication adapter in the program update process shown in FIG. 5.

FIG. 6 shows a conceptual diagram for illustrating a change in state of the communication adapter in the program update process shown in FIG. 5.

Referring to FIG. 6, in step S100, the program update process is started up in a state in which a program P1 stored in partition PT0 is in execution. At this time, program P0 is stored in partition PT1.

In step S110, partition PT1 is selected as the update partition, and thus, an update program P2 distributed from server 20 is stored in partition PT1 (S110 to S140). Then, in step S200, using a verification program, it is determined whether or not update program P2 is normal. When update program P2 is abnormal (NO in S200), i.e., when the process of writing the update program does not end normally, the operation of communication adapter 40 is continued in a state in which program P1 is in execution.

In contrast, when the process of writing the update program ends normally (YES in S200), the restart process by update program P2 is executed (S220) and communication adapter 40 operates in a state in which update program P2 is in execution. At this time, program P1 is still stored in partition PT0 and program P1 is regarded as "previous program".

In this state, communication with server 20 is verified, and when the server communication is normal (NO in S230), the operation of communication adapter 40 is continued in a state in which update program P2 is in execution.

In contrast, when the server communication is abnormal (YES in S230), the restart process by previous program P1 is executed (S240) and communication adapter 40 operates in a state in which previous program P1 is in execution. In this state, the communication with server 20 is again verified (S250).

When the server communication is normal in a state in which previous program P1 is in execution (NO in S250), the operation of communication adapter 40 is continued in a state in which previous program P1 is in execution. In contrast, when the server communication is abnormal in a state in which previous program P1 is in execution (YES in S250), normal communication with the server is impossible using any of update program P2 and previous program P1, and thus, it is determined that the defective communication is not caused by defectiveness of update program P2, and the restart process by update program P2 is executed (S260). After S260, the operation of communication adapter 40 is continued in a state in which update program P2 is in execution.

As described above, in the communication adapter according to the present embodiment, remote program update by distribution from management center 20 (server) can be achieved and it can be automatically verified whether or not normal communication with the server is possible by the update program.

Furthermore, by automatically verifying whether or not normal communication with the management center is possible by the previous program executed before the program update process, when defective communication with the server occurs, it can be determined whether or not the defective communication with the server is caused by the program. Particularly, in accordance with whether or not normal communication with the server is possible by the previous program, one of the previous program and the update program can be appropriately selected and communication adapter 40 can be operated. Namely, program update can be appropriately managed in accordance with a result of communication after the program update.

Communication adapter 40 may be built into a housing of hot water supply apparatus 100 or remote controller 105. In this case, a communication line connecting communication adapter 40 to a controller (not shown) of hot water supply apparatus 100 or remote controller 105 may be an internal wiring of the housing. Furthermore, the controller of hot water supply apparatus 100 or remote controller 105 and communication adapter 40 can also be mounted on the same substrate. In this case, the communication line (two-wire communication line 50 in FIG. 1) may be replaced with a wiring pattern on the substrate.

In addition, in communication adapter 40, three or more partitions can also be provided to store the program (firmware). With such a configuration as well, the program update process can be executed in accordance with the similar procedure, by specifying the partition in which the currently-executed program is stored and the partition in which the update program is stored, of the three or more partitions.

It should be understood that the embodiment disclosed herein is illustrative and not limitative in any respect. The scope of the present invention is defined by the terms of the claims, rather than description above, and is intended to include any modifications within the scope and meaning equivalent to the terms of the claims.

REFERENCE SIGNS LIST 10 hot water supply system; 20 management center (server); 21 server device; 21a cloud server; 21b application server; 26, 42, 43 communication unit; 27, 45 memory; 30 smartphone; 40 communication adapter; 41 controller; 44 power source circuit; 45a ROM; 45b RAM; 47 antenna; 49 manual switch; 50 two-wire communication line; 60 wireless LAN router; 70 support center; 71 terminal (support center); 80 tablet terminal; 100 hot water supply apparatus; 105 remote controller; A0 to A12, Az address; MA1 MAx, MAy address area; P0 to P2 program; PT0, PT1 partition.

The invention claimed is:

1. A communication adapter connected to a hot water using facility via a communication line, the communication adapter comprising:
a communication circuit that receives and transmits information from and to an external apparatus via a communication network;
a memory including a plurality of program storage areas whose stored contents are rewritable; and
a controller that operates the communication adapter by execution of a program stored in a specified one of the plurality of program storage areas, wherein
the communication circuit receives an update program from the external apparatus when a program update process is started up,
when the program update process is started up during execution of a program stored in a first program storage area of the plurality of program storage areas specified at the time of a startup process, the controller executes a process of writing the update program received by the communication circuit into a second program storage area, the second program storage area being a program storage area of the plurality of program storage areas different from the first program storage area, when the process of writing ends normally, the controller specifies the second program storage area and re-executes the startup process, while retaining contents stored in the first program storage area, after the controller specifies the second program storage area and re-executes the startup process, the controller verifies whether or not communication with the external apparatus is possible, and when normal communication with the external apparatus is possible, the controller ends the program update process in a state in which the communication adapter is in operation by the update program, after the controller specifies the second program storage area and re-executes the startup process, the controller verifies whether or not communication with the external apparatus is possible, and when normal communication with the external apparatus is impossible, the controller specifies the first program storage area and further re-executes the startup process, after the controller specifies the first program storage area and re-executes the startup process, the controller verifies whether or not communication with the external apparatus is possible, and when normal communication with the external apparatus is impossible after the controller specifies the first program storage area and re-executes the startup process, the controller again specifies the second program storage area and further re-executes the startup process, and ends the program update process in the state in which the communication adapter is in operation by the update program.

2. A communication adapter connected to a hot water using facility via a communication line, the communication adapter comprising:
   a communication circuit that receives and transmits information from and to an external apparatus via a communication network;
   a memory including a plurality of program storage areas whose stored contents are rewritable; and
   a controller that operates the communication adapter by execution of a program stored in a specified one of the plurality of program storage areas, wherein
   the communication circuit receives an update program from the external apparatus when a program update process is started up,
   when the program update process is started up during execution of a program stored in a first program storage area of the plurality of program storage areas specified at the time of a startup process, the controller executes a process of writing the update program received by the communication circuit into a second program storage area, the second program storage area being a program storage area of the plurality of program storage areas different from the first program storage area,
   when the process of writing ends normally, the controller specifies the second program storage area and re-executes the startup process, while retaining contents stored in the first program storage area,
   after the controller specifies the second program storage area and re-executes the startup process, the controller verifies whether or not communication with the external apparatus is possible, and when normal communication with the external apparatus is possible, the controller ends the program update process in a state in which the communication adapter is in operation by the update program,
   after the controller specifies the second program storage area and re-executes the startup process, the controller verifies whether or not communication with the external apparatus is possible, and when normal communication with the external apparatus is impossible, the controller specifies the first program storage area and further re-executes the startup process,
   after the controller specifies the first program storage area and re-executes the startup process, the controller verifies whether or not communication with the external apparatus is possible, and
   when normal communication with the external apparatus is possible after the controller specifies the first program storage area and re-executes the startup process, the controller ends the program update process in the state in which the communication adapter is in operation by the program stored in the first program storage area.

3. A program update method for a communication adapter connected to a hot water using facility via a communication line,
   the communication adapter operating by execution of a program stored in a specified one of a plurality of program storage areas,
   the program update method comprising:
   starting up a program update process in response to a program update request, during execution of a program stored in a first program storage area of the plurality of program storage areas specified at the time of a startup process;
   identifying a second program storage area in response to startup of the program update process, the second program storage area being a program storage area of the plurality of program storage areas different from the first program storage area;
   receiving an update program from an external apparatus;
   executing a process of writing the received update program into the second program storage area;
   when the process of writing ends normally, specifying the second program storage area and re-executing the startup process, while retaining contents stored in the first program storage area;
   after specifying the second program storage area and re-executing the startup process, verifying whether or not communication with the external apparatus is possible, and when normal communication with the external apparatus is possible, ending the program update process in a state in which the communication adapter is in operation by the update program;
   after specifying the second program storage area and re-executing the startup process, verifying whether or not communication with the external apparatus is possible, and when normal communication with the external apparatus is impossible, specifying the first program storage area and further re-executing the startup process;
   after specifying the first program storage area and re-executing the startup process, verifying whether or not communication with the external apparatus is possible; and when normal communication with the external apparatus is impossible after specifying the first program storage area and re-executing the startup process, again specifying the second program storage area and further re-executing the startup process, and ending the program update process in the state in which the communication adapter is in operation by the update program.

4. The program update method for the communication adapter according to claim 3, further comprising when normal communication with the external apparatus is possible after specifying the first program storage area and re-executing the startup process, ending the program update process in the state in which the communication adapter is in operation by the program stored in the first program storage area.

* * * * *